United States Patent [19]

Jubb et al.

[11] Patent Number: 5,698,134
[45] Date of Patent: Dec. 16, 1997

[54] ELECTROOPTICAL SYSTEM

[75] Inventors: Raymond Edward Jubb, Darmstadt;
Ulrich Finkenzeller, Plankstadt; Stefan Wilhelm, Heppenheim, all of Germany;
Shohei Naemura, Kanagawa, Japan;
Toshiyuki Hirai; Shuichi Kouzaki, both of Nara, Japan

[73] Assignees: Merck KGaA, Darmstadt, Germany;
Sharp Corporation, Osaka, Japan

[21] Appl. No.: 281,320

[22] Filed: Jul. 27, 1994

Related U.S. Application Data

[63] Continuation of Ser. No. 943,175, Sep. 14, 1992, abandoned.

[30] Foreign Application Priority Data

Sep. 13, 1991 [EP] European Pat. Off. ............ 91115517

[51] Int. Cl.$^6$ .................. C09K 19/52; C09K 19/00; G02F 1/13
[52] U.S. Cl. .................. 252/299.01; 252/299.61; 252/299.63; 252/299.66; 349/1; 349/183; 428/1
[58] Field of Search .................. 252/299.01, 299.63, 252/299.66, 299.61; 349/183, 1; 428/1

[56] References Cited

U.S. PATENT DOCUMENTS

| | | | |
|---|---|---|---|
| 4,888,126 | 12/1989 | Mullen et al. | 252/299.5 |
| 4,890,902 | 1/1990 | Doane et al. | 349/94 |
| 4,891,152 | 1/1990 | Miller et al. | 252/299.01 |
| 5,011,624 | 4/1991 | Yamagishi et al. | 252/299.5 |
| 5,211,876 | 5/1993 | Vaz et al. | 252/299.01 |
| 5,225,104 | 7/1993 | Van Steenkiste et al. | 252/299.01 |
| 5,240,636 | 8/1993 | Doane et al. | 252/299.01 |
| 5,304,323 | 4/1994 | Arai et al. | 252/299.5 |
| 5,323,251 | 6/1994 | Coates et al. | 349/89 |
| 5,344,587 | 9/1994 | Coates et al. | 252/299.66 |
| 5,356,557 | 10/1994 | Jubb et al. | 252/299.01 |
| 5,498,365 | 3/1996 | Nolan et al. | 252/299.01 |

FOREIGN PATENT DOCUMENTS

| | | |
|---|---|---|
| 0313053 | 4/1989 | European Pat. Off. . |
| 2260141 | 4/1993 | United Kingdom . |

*Primary Examiner*—Shean C. Wu
*Attorney, Agent, or Firm*—Millen, White, Zelano, & Branigan, P.C.

[57] ABSTRACT

The invention relates to an electrooptical system which between 2 electrode layers contains a liquid crystal mixture and a further optically transparent polymer medium, in which one of the electrode layers is in the form of an active matrix having nonlinear addressing elements integrated with the image point, while the other electrode layer forms the counter electrode, whose liquid crystal molecules have irregular orientation in the switched-off state, in which one of the refractive indices of the liquid crystal mixture is substantially the same as the refractive index of the medium $n_m$ and/or in which the quotient from the weight of the liquid crystal mixture and the weight of the optically transparent medium is 1.5 or more, which is one of the two switching states has reduced transmission compared with the other state independently of the polarization of the incident light, in which the liquid crystal mixture contains at least one compound of the formula I and the absolute value of the difference between the solubility parameter of the liquid crystal mixture and the solubility parameter of the precursor of the optically transparent polymer medium does not exceed 1.5 at room temperature.

27 Claims, 1 Drawing Sheet

ELECTROOPTICAL SYSTEM

This application is a continuation of application Ser. No. 07/943,175, filed Sep. 14, 1992 abandoned.

SUMMARY OF THE INVENTION

The invention relates to an electrooptical system which between 2 electrode layers contains a liquid crystal mixture and a further optically transparent polymer medium, in which one of the electrode layers is in the form of an active matrix having nonlinear addressing elements integrated with the image point, while the other electrode layer forms the counter electrode, whose liquid crystal molecules have irregular orientation in the switched-off state, in which one of the refractive indices of the liquid crystal mixture is substantially the same as the refractive index of the medium $n_o$ and/or in which the quotient of the weight of the liquid crystal mixture and the weight of the optically transparent medium is 1.5 or more, and which in one of the two switching states has reduced transmission compared with the other state independently of the polarization of the incident light.

The optically transparent medium can contain liquid crystal microdroplets delimited from one another or a sponge-like three-dimensional network in whose pores, the transition from pore to pore being more or less continuous, the liquid crystal is present. The expression liquid crystal microdroplets denotes small liquid crystal compartments delimited from one another, which, however, need not be spherical at all but can have an irregular shape and/or be deformed.

If the optically transparent medium contains liquid crystal microdroplets, it is hereinafter called a microdroplet system; if, on the other hand, a sponge-like three-dimensionally crosslinked structure is present, the medium is characterised by the expression "network".

NCAP and PDLC films (NCAP=nematic curvilinear aligned phases, PDLC=polymer dispersed liquid crystal) are examples of microdroplet systems. Examples of arrangements of this type are described in U.S. Pat. No. 4,435,047, EP 0,272,582, U.S. Pat. No. 4,688,900, U.S. Pat. No. 4,671,611 and Mol. Cryst. Liq. Cryst. Inc. Nonlin. Optics. 157 (1988) 427. In contrast, the arrangement described in EP 0,313,053 is a network or PN system (PN=polymer network) in which the optically transparent medium has a sponge-like network structure.

The nonlinear elements used for preparing the active matrix can have 2 or 3 connections. Examples of elements having 2 connections are α-Si:H diodes (N. Szydlo et al., Proc. 3rd Int. Display Res. Conf., Kobe; SID Los Angeles, 1983, p. 416), NINα-Si: H diodes (Z. Yaniv et al., Conf. Rec. 1985 Intern. Display Research Conference, IEEE, New York, 1985, p. 76), α-Si:H ring diodes (S. Togashi et al., Proceedings of the 4th International Display Research Conference, SEE, Paris, 1984, p. 141), MIM or MSI diodes (metal-insulator-metal, metal-silicon nitride-indium tin oxide; D. R. Baraff et al., Digest SID international Symposium, Los Angeles, 1980, p. 200; Suzuki et al., Proceedings of the 6th International Display Research Conference, Japan Display '86, 1986, p. 72) or ZnO varistores (D. E. Castleberry et al., SID '82 Digest, 1982, p. 246). The nonlinear elements having 3 connections are thin film transistors (TEE), of which several types are discussed and which differ in the semiconductor material used (for example α-Si:H, p-Si, CdSe, Te and other materials; see, for example, P. M. Knoll, Displays, Heidelberg 1986, p. 216; T-Nishimura, Mat. Res. Soc. Symp. Proc. 33 (1984) 221; C. S. Bak et al., Mat. Res. Soc. Symp. Proc. 33 (1984) 215; W. G. Hawkins et al., Mat. Res. Soc. Syrup. Proc. 33 (1984) 231; M. Matsuura et al., SID 1983 Symposium Digest, 1983, p. 148).

When nonlinear elements having 3 connections are used, only one connection is usually required for the counter electrode, while in the case of active matrix addressings, which are based on elements having 2 connections, the counter electrode is usually also scanned. However, active matrix addressings based on elements having 2 connections and in which only one electrode is scanned have also been proposed (Y. Baron et al., Proceedings of the 6th international Research. Conference 1986, Japan Display 86, p. 86), and furthermore the use of TFTs as an element having only 2 connections has also been discussed (C. Hilsum et al., Displays, January 1986, p. 37).

More details on the addressing of liquid crystal displays by an active matrix of nonlinear elements cab be found, for example, in A. H. Firester, SID, 1987, Society for Information Display Seminar, Seminar 5: Active Matrices for Liquid Crystals, E. Kaneko, Liquid Crystal Displays, KTK Scientific Publishers,. Tokyo, Japan, 1987, chapter 6 and 7 or P. M. Knoll, Displays, Heidelberg, 1986, p. 216ff.

No polarizers are required for operating microdroplet or network systems, as a result of which these systems have high transmission. Microdroplet or network systems provided with active matrix addressing have been proposed on the basis of these favorable transmission properties in particular for projection applications, but in addition also for displays having high information content and for further applications.

The liquid crystal mixtures used for producing the microdroplet or network systems have to meet a wide range of demands. Thus, in microdroplet systems, one of the refractive indices of the liquid crystal is selected such that it more or less coincides with the refractive index of the medium $n_M$. in network systems, the refractive index does not necessarily have to be adjusted, due to the usually much higher liquid crystal content of the light-modulating layer, although it may be done in order to increase the light throughput and the contrast.

The liquid crystal mixture can be dielectrically positive or dielectrically negative. The use of dielectrically positive liquid crystal mixtures is preferred, in which case the ordinary refractive index $n_o$ is in general adjusted to the refractive index of the matrix $n_M$. Other adjustments have been described in the literature (see, for example, EP 0,272, 585) or can be easily indicated by one skilled in the art.

The adjustment of the refractive indices achieves the result that incident light in the addressed state meets virtually no difference in refractive index between the aligned liquid crystal molecules and the medium and the arrangement appears transparent. Furthermore, the liquid crystals should have a high clearing point, a broad nematic range, no smectic phases down to low temperatures and high stability and be distinguished by an optical anisotropy Δn and a flow viscosity η which can be optimized with respect to the particular application and by a high dielectric anisotropy Δε.

A series of materials and processes have hitherto been proposed for producing the matrix or the network. Thus, for example, NCAP films are obtained according to the process described in U.S. Pat. No. 4,435,047 by intimately mixing the encapsulating polymer material, such as, for example, polyvinyl alcohol, the liquid crystal mixture and a support material, such as, for example, water, in a colloid mill. The support material is then removed, for example by drying. In contrast, in the PIPS process (polymerization induced phase separation) described in Mol. Cryst. Liq. Cryst. Inc. Nonlin. Optics 157 (1988), 427 and in the process described in EP 0,272,585, the liquid crystal mixture is first mixed with monomers or oligomers of the film-forming polymer before starting the polymerization. The microdroplet system described in Mol. Cryst. Liq. Cryst. Inc. Nonlin. Opt. 157 (1988), 427 is based on an epoxy film, while the arrangement described in EP 0,272,585 is an acrylate system.

When the microdroplet or network system is addressed by means of an active matrix, a further far-reaching criterion is added to the requirements listed so far which must be fulfilled by the liquid crystal mixture, the monomers and prepolymers and the cured polymer. This is related to the fact that each image point represents a capacitive load with respect to the particular active nonlinear element, which is charged at the rhythm of the addressing cycle. In this cycle, it is of paramount importance that the voltage applied, to an addressed image point drops only slightly until the image point is again charged in the next addressing cycle. A quantitative measure of the drop in voltage applied to an image point is the so-called holding ratio (HR) which is defined as the ratio of the drop in voltage across an image point in the non-addressed state and the voltage applied; a process for determining the HR is given, for example, in Rieger, B. et al., Conference Proceeding der Freiburger Arbeitstagung Flüssigkristalle (Freiburg Symposium on Liquid Crystsals), Freiburg 1989. Electrooptical systems having a low or relatively low HR show insufficient contrast.

It is true that considerable efforts have already been undertaken hitherto in order to optimize microdroplet and network systems with respect to the liquid crystal mixture used and the polymer system. On the other hand, however, only few investigations of electrooptical systems based on microdroplet or network systems and having active matrix addressing can be found in the literature, and no concepts have so far been proposed for providing electrooptical systems having a high HR. The previously mentioned systems fulfill the requirements for favorable properties of the liquid crystal mixture, monomers or oligomers and the cured polymer used combination with a high HR of the entire system only unsatisfactorily.

A further serious problem is often that the liquid crystal mixture has insufficient miscibility with the monomers, oligomers and/or prepolymers of the polymer used for forming the matrix or the network, which significantly impairs the production of PN systems and considerably limits in particular the use of PIPS technology in microdroplet matrix systems.

A further disadvantage is in particular that the liquid crystal mixture or individual components of the liquid crystal mixture are in many cases distinguished by an excessively high and/or significantly temperature-dependent solubility in the cured, matrix- or network-forming polymer. If, for example, the solubility or the temperature-dependence of the solubility of one or several components differs quite significantly from that of the remaining components, it may happen that the physical properties of the mixture and in particular also of the refractive indices $n_e$ and $n_o$ are substantially affected, which disturbs the adjustment of $n_o$ or $n_e$ or of another refractive index of the liquid crystal mixture to $n_M$, thus resulting in deterioration of the optical properties of the system. The "bleeding" described in EP 0,357,234, according to which at least some of the liquid crystal droplets have the tendency, when the matrix film is subjected to mechanical stress, to dissolve with diffusion of the liquid crystal to the film surface or into the matrix, is favored by a high solubility of the liquid crystal mixture in the cured polymer.

Consequently, there is a high demand for electrooptical systems which fulfill to a large extent the requirements described and which have in particular a high ER and are distinguished by good miscibility of the particular liquid crystal mixture with the monomers, oligomers and/or prepolymers of the polymer used and by low solubility of the liquid crystal mixture in the cured polymer.

The object of the invention was to provide electrooptical systems of this type and mixtures for producing systems of this type containing monomers, oligomers and/or prepolymers of the polymer used and a liquid crystal mixture.

It has been found that this object can be achieved if the liquid crystal mixture contains one or more compounds of the formula I

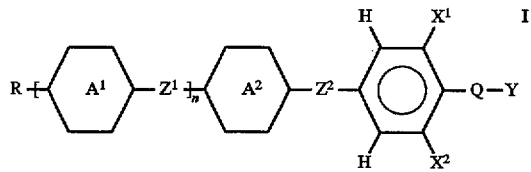

in which $Z^1$ and $Z^2$, independently of one another, are a single bond, —$CH_2CH_2$—, —COO—, —OCO— or —C≡C—,

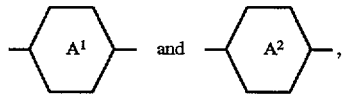

independently of one another, are trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene and one of

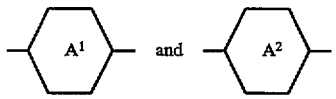

is optionally also pyrimidine-2,5-diyl, pyridine-2,5-diyl or trans- 1,3-dioxane-2,5-diyl, $X^1$ and $X^2$, independently of one another, are H or F, Q is $CF_2$, $OCF_2$, $C_2F_4$, $OC_2F_4$ or a single bond, Y is H, F or Cl n is 0, 1 and 2 and R is alkyl having up to 12 C atoms, in which one or two non-adjacent $CH_2$ groups can also be replaced by —O— and/or —CH=CH—, and if the monomers, oligomers and/or prepolymers forming the precursor of the optically transparent medium are selected such that the absolute value of the difference between the solubility parameter of the liquid crystal mixture and the solubility parameter of the precursor does not exceed 1.5 at room temperature.

Accordingly, the invention relates to an electrooptical system
which between 2 electrode layers contains a liquid crystal mixture and a further optically transparent polymer medium, in which one of the electrode layers is in the form of an active matrix having nonlinear addressing elements integrated with the image point, while the other electrode layer forms the counter electrode, whose liquid crystal molecules have irregular orientation in the switched-off state, in which one of the refractive indices of the liquid crystal mixture is substantially the same as the refractive index of the medium $n_m$ and/or in which the quotient from the weight of the liquid crystal mixture and the weight of the optically transparent medium is 1.5 or more, which in one of the two switching states has reduced transmission compared with the other state independently of the polarisation of the incident light, in which the liquid crystal mixture contains one or more compounds of the formula I and the monomers, oligomers and/or prepolymers forming the precursor of the optically transparent medium are selected such that the absolute value of the difference between the solubility parameter of the liquid crystal mixture and the solubility parameter of the precursor does not exceed 1.5 at room temperature.

For the sake of simplicity, Phe is 1,4-phenylene, Phe.2F is 2-fluoro-1,4-phenylene, Phe.3F is 3-fluoro-1,4-phenylene, Cyc is trans-1,4-cyclohexane, Pyr is pyrimidine-2,5-diyl and Pyd is pyridine-2,5-diyl, the two abbreviations Pyr and Pyd comprising in each case the two possible positional isomers. Furthermore, Phe.(F) is intended to designate a 1,4-phenylene group which may be unsubstituted or monosubstituted by fluorine in the 2 or position. Phe.2F3F and Phe.3F5F are a 1,4-phenylene group which is difluorinated in the 2 and 3 or 3 and 5 position respectively.

Electrooptical systems whose liquid crystal mixture contains one or more binuclear compounds of the formula I2 are preferred:

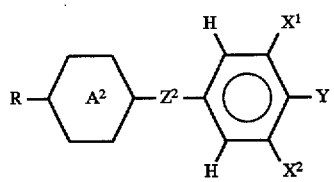

In the compounds of the formula I2, R is preferably alkyl or alkoxy having 1–10, but in particular 1–8, C atoms, the straight-chain radicals being preferred. Furthermore, n-alkoxyalkyl compounds and in particular n-alkoxymethyl and n-alkoxyethyl compounds are preferred.

$Z^2$ is preferably —CH$_2$CH$_2$—, —COO— or a single bond, in particular a single bond or —CH$_2$CH$_2$— and very particularly a single bond. Y is —F, —Cl, —OCHF$_2$, —OCF$_3$ or —CF$_3$ and in particular —F or —Cl.

Compounds of the formula I2 in which at least one of $X^1$ and $X^2$ is different from H are particularly preferred.

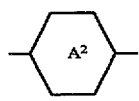

is preferably Cyc, Phe. (F), Phe.3F5F, Phe.2F3F, Pyr, Pyd or Dio and in particular Cyc, Phe. (F), Phe.3F5F, Phe. 2F3F, Pyr or Pyd.

Furthermore, electrooptical systems whose liquid crystal mixture contains one or more trinuclear compounds of the formula I3 are preferred:

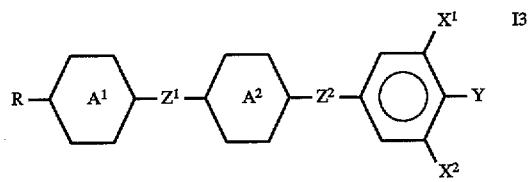

In the compounds of the formula I3, R is preferably n-alkyl or n-alkoxy having 1–10 C atoms, furthermore also n-alkoxymethyl or n-alkoxyethyl having 1–8 C atoms and n-alkenyl having up to 7 C atoms.

Very particular preference is given to compounds of the formulae I3 in which R is methyl, ethyl, propyl, butyl, pentyl, hexyl, heptyl, octyl, nonyl, decyl, methoxy, ethoxy, propoxy, butoxy, pentory, hexory, heptoxy, octoxy, methoxymethyl, ethoxymethyl, propoxy-methyl, butoxymethyl, methoxyethyl, ethoryethyl or proporyethyl. $Z^1$ and $Z^2$ in the compounds of the formulae I3 are, independently of one another, preferably —CH$_2$CH$_2$—, —COO— or a single bond and in particular —CH$_2$CH$_2$— or a single bond. Particular preference is given to those compounds of the formula I3 in which at least one of $Z^1$ or $Z^2$ is a single bond. Y is —F, —Cl, —OCHF$_2$, —OCF$_3$ or —CF$_3$ and in particular —F, —Cl, —OCHF$_2$ and —OCF$_3$.

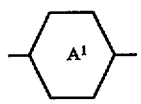

and

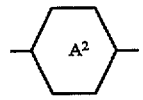

are, independently of one another, Cyc, Phe.(F), Phe.2F3F, Phe.3F5F, Phe.2F3F5F, Pyr, Pyd and Dio and in particular Cyc, Phe.(F), Phe.2F3F, Phe.3F5F, Phe.2F3F5F, Pyr and Pyd.

Furthermore, electrooptical systems whose liquid crystal mixture contains one or more tetranuclear compounds of the formula I4 are preferred:

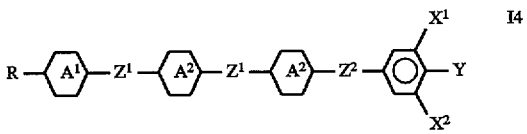

In the compounds of formula I4, R is preferably n-alkyl or n-alkoxy having 1–10 C atoms, furthermore also n-alkoxymethyl or n-alkoxyethyl having 1–8 C atoms.

Very particular preference is given to compounds of the formulae I4 in which R is methyl, ethyl, propyl, butyl, pentyl, hexyl, heptyl, octyl, nonyl, decyl, methoxy, ethoxy, propoxy, butoxy, pentory, hexory, heptoxy or octoxy.

In the compounds of the formula I4, preferably not more than 2 and in particular only one of the bridges $Z^1$ and $Z^2$ are different from a single bond.

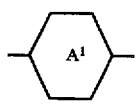

and

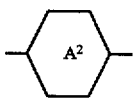

are preferably, independently of one another, Cyc, Phe.2F, Phe.3F, Phe, Pyr or Pyd. Compounds of the formula I4 in which at least one of

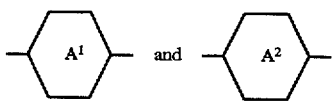

is Phe.2F or Phe.3F are preferred. The weight proportion of the compounds of the formulae I4 in the liquid crystal mixture of the electrooptical systems according to the invention is preferably not too high and is in particular less than 20%, the use of laterally fluorinated compounds of the formula I4 being in many cases preferred.

It has been found that electrooptical systems whose liquid crystal mixture contains one or more compounds of the formulae I2, I3 or I4 and whose transparent polymer medium is obtained by polymerization of a precursor, in which the liquid crystal mixture and the precursor are matched to one another such that the absolute value of the difference between the solubility parameter of the liquid crystal mixture and the solubility parameter of the precursor does not exceed 1–5 at room temperature have particularly favorable properties.

These systems are distinguished by advantageous values for the threshold voltage, a high UV and temperature stability, by a favorable operating temperature range, by favorable values for the temperature-dependence of the electrooptical parameters, by a high contrast and in particular by a high HR.

The solubility parameter $\delta$ for nonpolar or weakly polar organic compounds such as is the case with liquid crystal compounds or mixtures and, monomers, oligomers and/or prepolymers is given, according to the Hildebrand equation, by $$\delta = \left( \frac{D(\Delta H_v - RT)}{M} \right)^{1/2}$$

in which

D is the density, $\Delta H_v$ the enthalpy of evaporation,

T the absolute temperature in K,

M the molecular weight of the compounds and

R the gas constant.

$\delta$ is usually given in $(cal/cm^3)^{1/2}$, this unit also being designated as Hildebrand H.

If $\Delta H_v$ values are not available or—as is the case, for example, for polymer materials—it is virtually impossible to measure them, $\delta$ can also be estimated from the molar attraction constants given by Small. A list of Small's constants can be found, for example, in R. F. Fedors, Polymer Engineering and Science, 14 (1974) 147, where further procedures for estimating $\delta$ are also given. The solubility parameters estimated by the different methods do not differ very greatly in many cases and can in general be used side by side. In doubtful cases, the $\delta$ values calculated by the method developed by Fedors (see loc. cit.) should be used.

For the liquid crystal compounds used in the liquid crystal mixture LC-I below, solubility parameters between 8.94 and 9.64 were obtained by the method developed by Fedors (see loc. cit.).

| COMPOUND | Weight proportion (%) | Solubility parameter (H) |
|---|---|---|
| $H_{11}C_5$-Cyc-Phe-F | 12.0 | 9.24 |
| $H_{13}C_6$-Cyc-Phe-F | 10.0 | 9.20 |
| $H_{15}C_7$-Cyc-Phe-F | 10.0 | 9.17 |
| $H_7C_3$-Cyc-Phe.2F-Phe-Cyc-$C_3H_7$ | 3.0 | 9.64 |
| $H_{11}C_5$-Cyc-Phe.2F-Phe-Cyc-$C_3H_7$ | 4.0 | 9.57 |
| $H_{11}C_5$-Cyc-Phe.2F-Phe-Cyc-$C_5H_{11}$ | 3.0 | 8.94 |
| $H_7C_3$-Cyc-Cyc-Phe-$OCF_3$ | 13.0 | 9.13 |
| $H_{11}C_5$-Cyc-Cyc-Phe-$OCF_3$ | 12.0 | 9.08 |
| $H_7C_3$-Cyc-Cyc-$CH_2CH_2$-Phe.3F-F | 13.0 | 9.41 |
| $H_7C_3$-Cyc-Cyc-$CH_2CH_2$-Phe-$OCF_3$ | 11.0 | 9.08 |
| $H_{11}C_5$-Cyc-Cyc-$CH_2CH_2$-Phe-$OCF_3$ | 8.0 | 9.04 |

Taking into account the weight proportions of the individual compounds, an average value of $\delta=9.20$ H is obtained for the liquid crystal mixture.

This liquid crystal mixture was combined in various experiments with the following commercially available monomers in order to produce the corresponding precursor:

| Monomer Formula | Name | Solubility parameter of the monomer (H) | $\Delta = |\delta_{LC} - \delta_M|$ | Experiment No. |
|---|---|---|---|---|
| $CH_2=CHCOOCH_2CHC_4H_3$<br>  \|<br>  $C_2H_9$ | 2EHA | 8.77 | 0.43 | 1 |
| (structure with $CH_2=CHCOCH_2C-CH$, $CH_3$, $OCH_2$, $CH_2CH_3$, C, $OCH_2$, $CH_2OCCH_2=CH_2$) | R-604 | 9.65 | 0.45 | 2 |

-continued

| Monomer Formula | Name | Solubility parameter of the monomer (H) | $\Delta = \|\delta_{LC} - \delta_M\|$ | Experiment No. |
|---|---|---|---|---|
| CH$_2$=CHC(OCH$_2$CH$_2$CH$_2$CH$_2$CH$_2$C)$_n$OCH$_2$C(CH$_3$)(O)—COCH$_2$C(CH$_3$)CH$_2$O(CCH$_2$CH$_2$CH$_2$CH$_2$CH$_2$O)$_m$CCH$_2$CH$_2$  <br> n + m = 2 | HX-220 | 9.95 | 0.75 | 3 |
| CH$_2$=CHC(OCH$_2$CH$_2$CH$_2$CH$_2$CH$_2$C)$_n$OCH$_2$C(CH$_3$)(O)—COCH$_2$C(CH$_3$)CH$_2$O(CCH$_2$CH$_2$CH$_2$CH$_2$CH$_2$O)$_m$CCH$_2$CH$_2$  <br> n + m = 4 | HX-620 | 10.02 | 0.82 | 4 |

| Monomer Formula | Name | Solubility parameter of the monomer (H) | $\Delta = \|\delta_{LC} - \delta_M\|$ | Experiment No. |
|---|---|---|---|---|
| CH$_2$=CHC(O)(OCH$_2$CH$_2$)$_m$O—⟨Ph⟩—C(H)(H)—⟨Ph⟩—(CH$_2$CH$_2$O)$_n$CCH—CH$_2$  <br> n + m = 4 | R-712 | 10.58 | 1.38 | 6 |
| CH$_2$=CHCOCH$_2$CHCH$_2$O—⟨Ph⟩  <br>         OH | R-128 | 12.10 | 2.90 | 7 |
| CH$_2$=CHCOOCH$_2$CH$_2$OH | HOA | 13.91 | 4.71 | 8 |

BRIEF DESCRIPTION OF THE DRAWINGS

In FIG. 1, the mixing temperature T$_M$ at which homogenous mixture of the liquid crystal mixture LC-I with the particular monomer (mixing ratio in each case 1:1) is obtained has been plotted against the solubility parameter $\delta_M$ of the monomer calculated by the method developed by Fedors. The dashed line marks the solubility parameter $\delta_{LC-I}$ of the liquid crystal mixture LC-I. It can be seen from FIG. 1 that mixing temperatures of less than 100° C. are observed for the monomers 2 EHA, R 604, HX 220 and HX 620 and the liquid crystal mixture LC-I, while LC-I is virtually immiscible with R 551, R 712, R 128 and HOA.

In extensive further investigations, it was found that the absolute value of the difference between the solubility parameter of the liquid crystal mixture used according to the invention and the solubility parameter of the precursor for achieving sufficient miscibility of liquid crystal mixture and precursor is less than 1.5 and in particular does not exceed 1.0.

The teaching according to the invention for the first time provides a quantitative criterion as to how the precursor, given a certain liquid crystal mixture, should be selected to ensure sufficient miscibility of liquid crystal mixture and monomers, oligomers and/or prepolymers. The present invention which makes a specific selection of suitable monomers, oligomers and/or pre-polymers from the large pool of commercially available and/or synthesizable polymerizable components possible, is thus of significant commercial importance.

Figure 1:
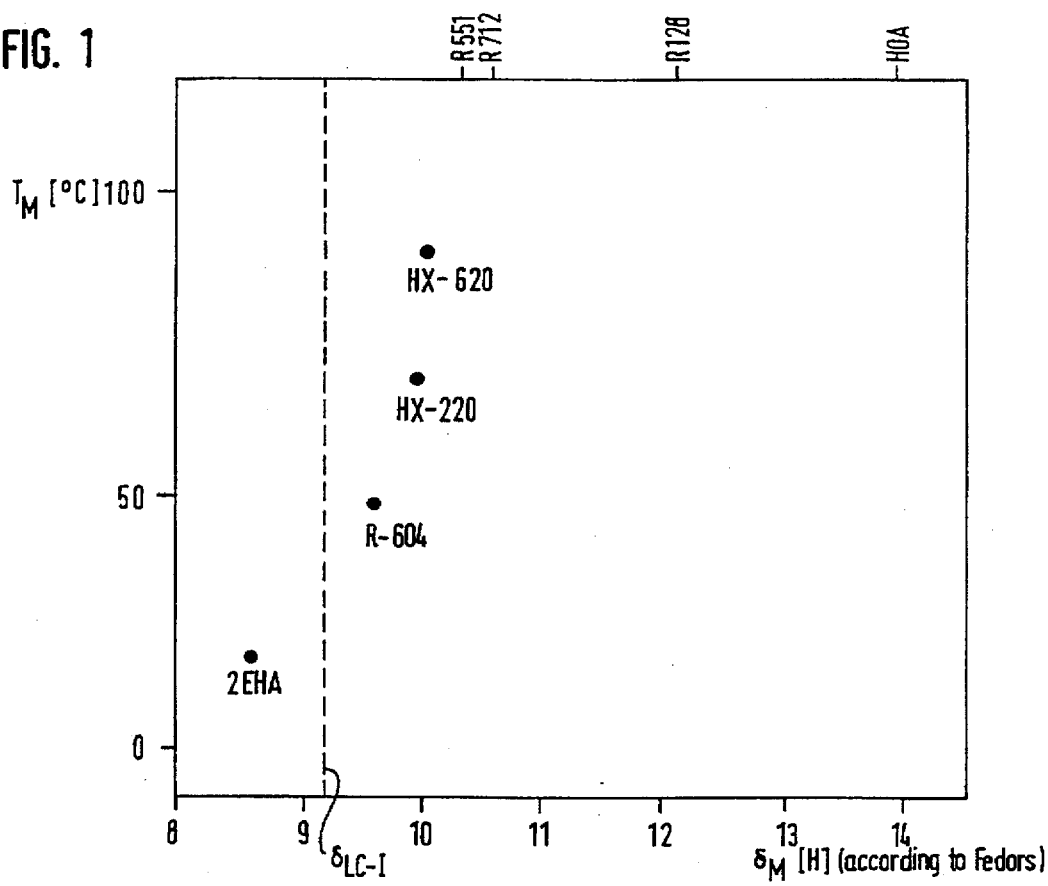
FIG. 1 discloses a plot of the mixing temperature at which a homogeneous mixture LC-I and various monomers is plotted against the solubility parameter of the monomer.
Figure 2:
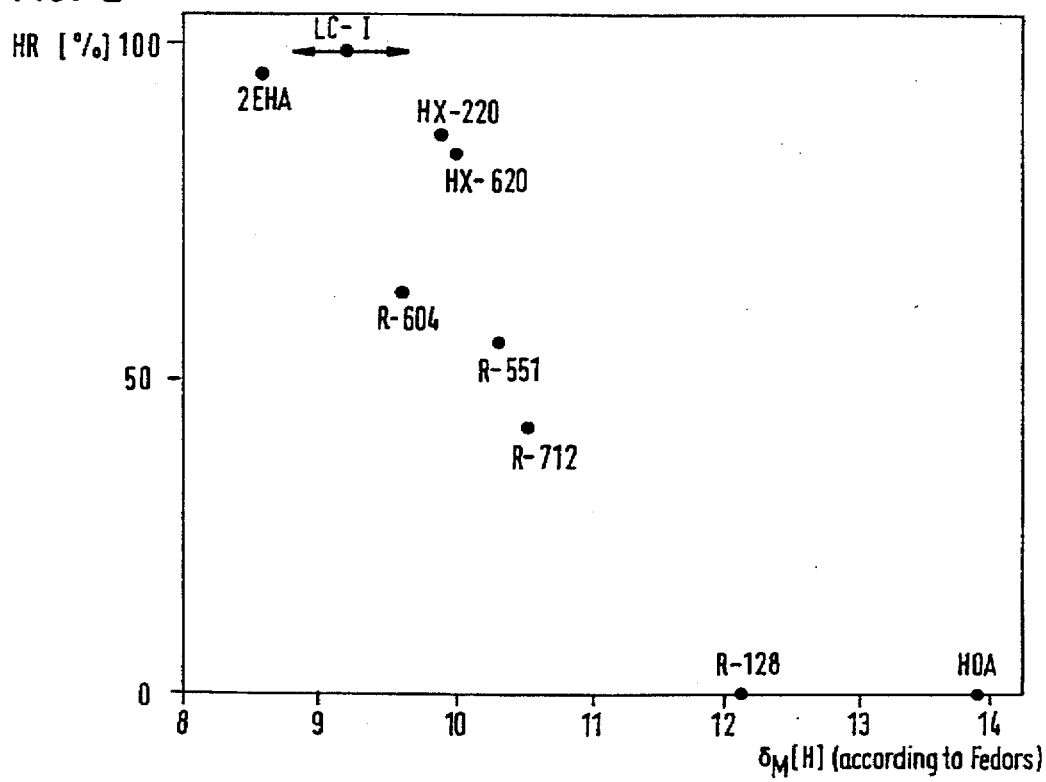
FIG. 2 represents a plot of the holding ratio for the monomers of FIG. 1 against the solubility parameter thereof.

In FIG. 2, the holding ratio HR (in per cent) for the abovementioned monomers is plotted against the solubility parameter $\delta_M$ calculated by the method of Fedors. It can be seen from FIG. 2 that 2 EHA is distinguished by a very good value and HX 220 and HX 620 by a good value for the HR, while R 604, R 551 and R 712 have substantially lower values for the HR.

In extensive investigations, it was found that electrooptical systems whose liquid crystal mixture contains at least one compound of the formula I, for which the absolute value of the difference between the solubility parameter of the liquid crystal mixture and the solubility parameter of the monomers, oligomers and/or prepolymers is at most 1.5 and whose monomers, oligomers and/or prepolymers have a value of at least 50%, in particular of more than 60% and very particularly of more than 75% for the holding ratio are distinguished by favorable properties and can be readily prepared in particular by the PIPS process and have a high HR.

This finding, which has far-reaching practical implications for the optimization of systems according to the invention, is surprising, since ultimately the HR value of the cured system is the determining factor and a good or very good HR value of the liquid crystal mixture and monomers, oligomers and/or pre-polymers does not necessarily lead to the conclusion that the cured system also has a high HR value.

In order to prepare the systems according to the invention, monomers, oligomers and/or prepolymers having a wide range of polymerizable groups, such as, for example, substituted or unsubstituted vinyl groups

unsubstituted or substituted acryloyloxy groups

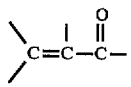

or substituted or unsubstituted epoxy groups

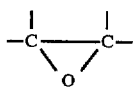

can be used.

In many cases preference is given to olefinically unsaturated monomers, oligomers and/or prepolymers which can be initiated by free radicals, or mixtures of oligomers and/or prepolymers with unsaturated monomers.

Below, suitable olefinically unsaturated classes of compounds are listed, which, however, are to be understood as examples and are intended merely for illustrating the invention and not limiting it: vinyl chlorides, vinylidene chlorides, acrylonitriles, methacrylonitriles, acrylamides, methacrylamides, methylacrylates or methacrylates, ethylacrylates or methacrylates, n- or tert.-butylacrylates or methacrylates, cyclohexylacrylates or methacrylates, 2-ethylhexylacrylates or methacrylates, benzylacrylates or methacrylates, phenyloxyethylacrylates or methacrylates, hydroxyethylacrylates or methacrylates, hydroxypropylacrylates or methacrylates, lower alkoxyethylacrylates or methacrylates, tetrahydrofurfuryl acrylates or methacrylates, vinyl acetates, vinyl propionates, vinyl acrylates, vinyl succinates, N-vinylpyrrolidones, N-vinylcarbazoles, styrenes, divinylbenzenes, ethylene diacrylates, 1,6-hexanediol diacrylates, bisphenol A diacrylates and dimethacrylates, trimethylolpropane diacrylates, pentaerythritol triacrylates, triethylene glycol diacrylates, ethylene glycol dimethacrylates, tripropylene glycol triacrylates, pentaerythritol triacrylates, pentaerythritol tetraacrylates, ditrimethylpropane tetraacrylates and dipentaerythritol pentaacrylates or hexaacrylates.

Further suitable olefinically unsaturated precursors are listed, for example, in EP 0,272,585 and EP 0,313,053.

Of these, those monomers, oligomers and/or prepolymers are preferred whose curing leads to polymers whose solubility parameter $\delta_P$ is smaller by at least 3 than the solubility parameter of the liquid crystal mixture $$\delta_{LC} - \delta_P \geq 3$$

this difference is in particular greater than 3.5 and very particularly at least 4.

Furthermore, it was found that electrooptical systems for which the difference between the solubility parameter of the polymerization initiator and the solubility parameter of the liquid crystal mixture $$\delta_{PI} - \delta_{LC} \geq 2.0$$

and is in particular at least 2.5 are preferred.

In the table below, a few free radical photoinitiators are summarized together with their $\delta$ values calculated according to Fedors by way of example, which can be used advantageously, for example when using the abovementioned mixing example LC-I:

| Free radical photoinitiator | Solubility parameter [H] |
|---|---|
| ![structure with CH3, HC, CH3 groups on benzene with C(=O)-C(CH3)2-OH] | 11.46 |
| ![benzene with C(=O)-C(CH3)2-OH] | 12.39 |
| HO—CH2CH2O—[benzene]—C(=O)—C(CH3)2—OH | 13.99 |
| ![benzene-C(=O)-C(OH)(H)-cyclohexyl] | 12.24 |

Depending on the nature of the polmerizable groups, the polymerization can proceed by different mechanisms, free radical photopolymerization and cationic photopolymerization processes being preferred. The selection of the initiators should be guided by the abovementioned solubility criterion but is otherwise less critical.

The mixture composed of the precursor, the liquid crystal mixture and the polymerization initiator can, if desired, contain further additives, such as, for example, antioxidants, light stabilizers, if desired, crosslinking agents for increasing the degree of crosslinking, and the like. These additives should have the highest possible resistivity and be purified correspondingly. Since additives of this type are often only added in small or very small concentrations which are significantly lower than the initiator concentration, it is sometimes also possible to tolerate a relatively low value for the resistivity without a too strong decrease in the HR of the electrooptical system; this is the case in particular if the concentration of the additives, relative to the weight of the entire system, is less than 1.0% and in particular less than 0.5%.

The liquid crystal mixtures used in the electrooptical systems according to the invention can also contain, in addition to compounds of the formula I, nitrile compounds of the formulae II-V

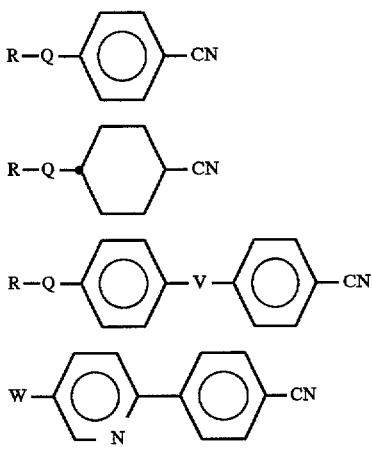

in which

R is in each case, independently of one another, an alkyl group having 1–15 C atoms, in which one or two non-adjacent CH₂ groups can also be replaced by —O—, —CO— and/or —CH=CH—, V is a single bond, —COO— or —OOC—, Q is

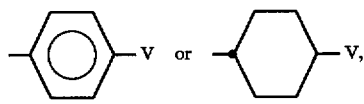

and

W is R, R—

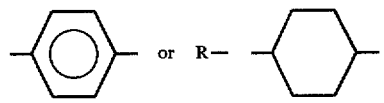

However, it has been shown that systems according to the invention whose liquid crystal mixture contains more than 15% of nitrile compounds is often distinguished by an insufficient HR value.

The proportion of nitrile compounds, relative to the weight of the liquid crystal mixture, is preferably small and in particular not higher than 10% and very particularly not higher than 7.5%. Systems according to the invention whose liquid crystal mixtures do not contain any nitrile compounds are very particularly preferred.

The proportion of the compounds of the formula I in the liquid crystal mixtures used according to the invention is preferably not too small and is in particular more than 10% and very particularly more than 20%. Liquid crystal mixtures containing more than 40% and in particular not less than 50% of compounds of the formula I are particularly preferred.

The liquid crystal mixtures used according to the invention can contain further components which are preferably selected from nematic or nematogenic (monotropic or isotropic) substances, in particular substances from the groups comprising azoxybenzenes, benzylidene-anilines, biphenyls, terphenyls, phenyl or cyclohexyl benzoates, phenyl or cyclohexyl cyclohexanecarboxylates, phenyl or cyclohexyl cyclohexylbenzoates, phenyl or cyclohexyl cyclohexylcyclohexanecarboxytates, cyclohexyl-phenyl benzoate, cyclohexylphenyl cyclohexanecarbexylate, or cyclohexylphenyl cyclohexylcyclohexanecarbexylate, phenylcyclohexanes, cyclohexylbiphenyls, phenylcyclohexylcyclohexanes, cyclohexylcyclohexanes, cyclohexylcyclohexenes, cyclohexylcyclohexylcyclohexenes, 1,4-bis (cyclohexyl) benzenes, 4,4'-bis(cyclohexyl)biphenyls, phenyl- or cyclohexylpyrimidines, phenyl- or cyclohexylpyridines, phenyl- or cyclohexyldioxanes, phenyl- or cyclohexyl- 1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes, halogenated or unhalogenated stilbenes, benzyl phenyl ethers, tolans and substituted cinnamic acids. The 1,4-phenylene groups in these compounds can also be fluorinated.

The liquid crystal mixtures used in the electrooptical systems according to the invention preferably also contain one or more dielectrically neutral compounds of the formulae 1–5:

| | |
|---|---|
| R''—L—E—R''' | 1 |
| R''—L—COO—E—R''' | 2 |
| R''—L—OOC—E—R''' | 3 |
| R''—L—CH₂CH₂—E—R''' | 4 |
| R''—L—C≡C—E—R''' | 5 |

In the formulae 1, 2, 3, 4 and 5, L and E, which may be identical or different, are each, independently of one another, a bivalent radical from the group comprising —Phe—, —Cyc—, —Phe—Phe—, —Phe—Cyc—, —Cyc—Cyc—, —Pyr—, —Dio—, —G—Phe— and —G—Cyc— and mirror images thereof, Phe being unsubstituted or fluorine-substituted 1,4-phenylene, Cyc being trans-1,4-cyclohexylene or 1,4-cyclohexenylene, Pyr being pyrimidine-2,5-diyl or pyridine-2,5-diyl, Dio being 1,3-dioxane-2,5-diyl and G being 2-(trans-1,4-cyclohexyl) ethyl, pyrimidine-2,5-diyl, pyridine-2,5-diyl or 1,3-dioxane-2,5-diyl.

One of the radicals L and E is preferably Cyc, Phe or Pyr. E is preferably Cyc, Phe or Phe-Cyc. The liquid crystals according to the invention preferably contain one or more components selected from compounds of the formulae t, 2, 3, 4 and 5, in which L and E are selected from the group comprising Cyc, Phe and Pyr and simultaneously one or more components are selected from the compounds of the formulae 1, 2, 3, 4 and 5, in which one of the radicals L and E is selected from the group comprising Cyc, Phe and Pyr and the other radical is selected from the group comprising —Phe—Phe—, —Phe—Cyc—, —Cyc—Cyc—, —G—Phe— and —G—Cyc—, and, if desired, one or more components are selected from the compounds of the formulae 1, 2, 3, 4 and 5, in which the radicals L and E are selected from the group comprising —Phe—Cyc—, —Cyc—Cyc—, —G—Phe— and —G—Cyc—.

R''' and R'' in the compounds of the subformulae 1a, 2a, 3a, 4a and 5a are each, independently of one another, preferably alkyl, alkenyl, alkoxy, alkenyloxy or alkanoyloxy having up to 8 carbon atoms. In most of these compounds, R''' and R'' are different from one another, one of these radicals being in particular alkyl, alkoxy or alkenyl.

The weight proportion of the compounds of the formulae 1–5 in the liquid crystals used according to the invention is preferably 0–50% and in particular 0–40%.

The liquid crystal mixtures used in the electrooptical systems according to the invention preferably contain 1–98%, in particular 5–95%, of compounds of the formula I. The liquid crystals preferably contain 1–20, but in particular 1–15, and very particularly 1–12, compounds of the formula I.

One skilled in the art can select additives for the liquid crystal mixtures described from the large pool of nematic or nematogenic substances in such a manner that the birefringence Dn and/or the ordinary refractive index $n_o$ and/or other refractive indices and/or the viscosity and/or the dielectric anisotropy and/or further parameters of the liquid crystal are optimised with respect to the particular application.

The electrooptical systems according to the invention are distinguished by favourable values for the threshold voltage and the steepness of the electrooptical characteristic and a high UV and temperature stability, a high contrast and in particular by a high HR—even at elevated temperatures and on exposure to UV irradiation—a low solubility of the liquid crystal mixture in the polymer medium and a high long term stability.

The problems arising when addressing microdroplet or network systems by means of an active matrix are solved by the electrooptical system according to the invention in a more satisfactory manner than in previously described arrangements of this type. The invention provides for the first time a quantitative criterion which makes it possible to select substances from the large pool of precursor materials and photoinitiators, in addition to the existing, particularly suitable liquid crystal mixtures specifically containing at least one compound of the formula I in such a manner that optimized systems according to the preamble of claim 1 are obtained.

The example which follows is intended to illustrate the invention without limiting it.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding application European No. 91115517.4, filed Sep. 13, 1991, are hereby incorporated by reference.

EXAMPLE 1

The abovementioned liquid crystal mixture LC-I-is stirred together with 2-EHA and Darocur 1173 in a weight ratio of 1.5:0.95:0.05 at room temperature until a clear solution is obtained. The solution is placed together with spacers (16 μm) between 2 transparent glass substrates provided with electrode layers, giving a uniform film having a thickness of 16 μm which is cured by UV irradiation (480 W UV lamp). One of the electrode layers is in the form of an active TFT matrix, while the other electrode constitutes the counter electrode. After curing, the system has an HR of 96.4.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An electrooptical system comprising:

2 electrode layers containing therebetween a liquid crystal mixture and an optically transparent polymer medium, the liquid crystal mixture being dispersed in the polymer medium either as microdroplets or as a continuous phase, one of the electrode layers being an active matrix having nonlinear addressing elements integrated with an image point, and the other electrode layer forming a counter electrode, the molecules of the liquid crystal mixture having irregular orientation in the switched-off state, one of the refractive indices of the liquid crystal mixture being substantially the same as the refractive index of the medium $n_m$ and/or the ratio of the weight of the liquid crystal mixture to the weight of the optically transparent medium being 1.5 or more, one of the two switching states having reduced transmission compared with the other state independent of the polarization of the incident light, wherein the liquid crystal mixture comprises not more than 15% of nitrile compounds and at least one compound of formula I

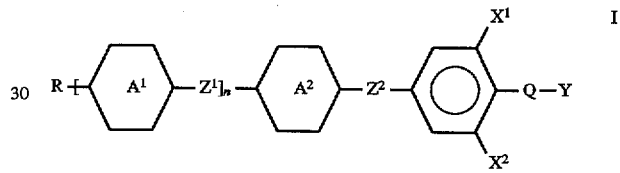

in which $Z^1$ and $Z^2$, independently of one another, are a single bond, —CH$_2$CH$_2$—, —COO—, —OCO— or —C≡C—, —AL$^1$— and —A$^2$—, independently of one another, are trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene and one of —A$^1$— and —A$^2$— is optionally also pyrimidine-2,5-diyl, pyridine-2,5-diyl or trans-1,3-dioxane-2,5-diyl, $X^1$ and $X^2$, independently of one another, are H or F, Q is CH$_2$, OCF$_2$, C$_2$F$_4$ or a single bond, Y is H, F or Cl, n is 0, 1 and 2 and R is alkyl having up to 12 C atoms, in which one or two non-adjacent CH$_2$ groups is each independently optionally replaced by —O— or —CH=CH—, and wherein the solubility parameter of the compounds of formula I is 8 to 10, and precursor monomers, oligomers or prepolymers from which the optically transparent polymer medium is produced are selected such that the absolute value of the difference between the solubility parameter of the precursor and the solubility parameter of the liquid crystal mixture does not exceed 1.5 at room temperature.

2. A system according to claim 1, wherein the difference between the solubility parameter of the liquid crystal mixture and the solubility parameter of the transparent polymer medium is at least 3.

3. A system according to claim 1, wherein a polymerization initiator for the production of the polymer medium is selected that the difference between the solubility parameter of the polymerization initiator and the solubility parameter of the liquid crystal mixture is at least 2.

4. A system according to claim 1, wherein the precursor monomers, oligomers or prepolymers contain substituted or unsubstituted vinyl groups, substituted or unsubstituted acryloyloxy groups, or substituted or unsubstituted epoxy groups.

5. A system according to claim 1, wherein the precursor monomers, oligomers or prepolymers are olefinically unsaturated and can be initiated by free radicals.

6. A system according to claim 5, wherein the precursor is a vinyl chloride, vinylidene chloride, acrylonitrile, methacrylonitrile, acrylamide, methacrylamide, methylacrylate, methyl methacrylate, ethylacrylate, ethyl methacrylate, n- or tert-butylacrylate, bi- or tertbutyl methacrylate, cyclohexylacrylate, cyclohexyl methacrylate, 2-ethylhexylacrylate, 2-ethylhexyl methacrylate, benzylacrylate, benzyl methacrylate, phenyloxyethylacrylate, phenyloxy ethyl methacrylate, hydroxyethylacrylate, hydroxyethyl methacrylate, hydroxypropylacrylate, hydroxypropyl methacrylate, alkoxyethylacrylate, alkoxy methacrylate, tetrahydrofurfuryl acrylate, tetrahydrofurfuryl methacrylate, vinyl acetate, vinyl propionate, vinyl acrylate, vinyl succinate, N-vinylpyrrolidone, N-vinyl-carbazole, styrene, divinylbenzene, ethylene diacrylate, 1,6-hexanediol diacrylate, bisphenol A diacrylate, bisphenol A dimethacrylate, trimethylolpropane diacrylate, pentaerythritol triacrylate, triethylene glycol diacrylate, ethylene glycol dimethacrylate, tripropylene glycol triacrylate, pentaerythritol triacrylate, pentaerythritol tetraacrylate, ditrimethylpropane tetraacrylate, dipentaerythritol pentaacrylate or dipentaerythritol hexaacrylate.

7. A system according to claim 6, wherein curing of the precursor produces a final, cured polymer with a solubility parameter δp, which is smaller by at least 3 than the solubility parameter of the liquid crystalline mixture.

8. A system according to claim 1, wherein the amount of nitrile compounds is not more than 10%.

9. A system according to claim 1, wherein the amount of nitrile compounds is not more than 7.5%.

10. A system according to claim 1, which is essentially free of nitrile compounds.

11. A system according to claim 1, with the proviso that no pyridine- or pyrimidine-containing compounds are present.

12. A system according to claim 1, wherein the solubility parameter of the monomers, oligomers or prepolymers is 8-10.

13. A system according to claim 1, wherein the solubility parameter of the compounds of claim 1 is 8.94 to 9.64.

14. A mixture comprising a monomer, oligomer or prepolymer precursor of an optically transparent polymer medium, or a mixture thereof, and a liquid crystalline mixture comprising not more than 15% of nitrile compounds, and at least one compound of formula I

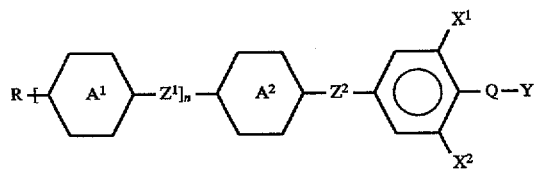

in which $Z^1$ and $Z^2$, independently of one another, are a single bond, —$CH_2CH_2$—, —COO—, —OCO— or —C≡C—, —$A^1$— and —$A^2$—, independently of one another, are trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene and one of —$A^1$— and —$A^2$— is optionally also pyrimidine-2,5-diyl, pyridine-2,5-diyl or trans-1,3-dioxane-2,5-diyl, $X^1$ and $X^2$, independently of one another, are H or F, Q is $CH_2$, $OCF_2$, $C_2F_4$ or a single bond, Y is H, F or Cl, is 0, 1 and 2 and R is alkyl having up to 12 C atoms, in which one or two non-adjacent $CH_2$ groups is each independently optionally replaced by —O— or —CH=CH—, in which the absolute value of the difference between the solubility parameter of the liquid crystal mixture and the monomer, oligomer or prepolymer precursor or mixture thereof does not exceed 1.5 at room temperature.

15. A mixture according to claim 14, further comprising a polymerization initiator, in which the difference between the solubility parameter of the polymerization initiator and the solubility parameter of the liquid crystal mixture is at least 2.

16. An electrooptical system comprising:

2 electrode layers containing therebetween a liquid crystal mixture and an optically transparent polymer medium, one of the electrode layers being an active matrix having nonlinear addressing elements integrated with an image point, and the other electrode layer forming a counter electrode, the ratio of the weight of the liquid crystal mixture to the weight of the optically transparent medium being 1.5 or more, wherein the liquid crystal mixture comprises not more than 15% of nitrile compounds and at least one compound of formula I

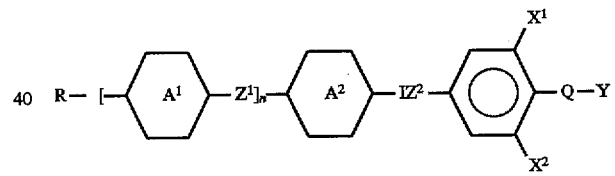

in which $Z^1$ and $Z^2$, independently of one another, are a single bond, —$CH_2CH_2$—, —COO—, —OCO— or —C≡C—, —$A^1$— and —$A^2$—, independently of one another, are trans-1,4-cyclohexylene, 1,4-phenylene, 2-fluoro-1,4-phenylene, 3-fluoro-1,4-phenylene, 2,3-difluoro-1,4-phenylene or 3,5-difluoro-1,4-phenylene and one of —$A^1$— and —$A^2$— is optionally also pyrimidine-2,5-diyl, pyridine-2,5-diyl or trans-1,3-dioxane-2,5-diyl, $X^1$ and $X^2$, independently of one another, are H or F, Q is $CH_2$, $OCF_2$, $C_2F_4$ or a single bond, Y is H, F or Cl, n is 0, 1 and 2 and R is alkyl having up to 12 C atoms, in which one or two non-adjacent $CH_2$ groups is each independently optionally replaced by —O— or —CH=CH—, and wherein the solubility parameter of the compounds of formula I is 8 to 10, and precursor monomers, oligomers or prepolymers from which the optically transparent polymer medium is produced are selected such that the absolute value of the difference between the solubility parameter of the precursor and the solubility parameter of the liquid crystal mixture does not exceed 1.5 at room temperature.

17. A system according to claim 16, wherein the difference between the solubility parameter of the liquid crystal mixture and the solubility parameter of the transparent polymer medium is at least 3.

18. A system according to claim 16, wherein the precursor monomers, oligomers or prepolymers contain substituted or unsubstituted vinyl groups, substituted or unsubstituted acryloyloxy groups, or substituted or unsubstituted epoxy groups.

19. A system according to claim 16, wherein the precursor monomers, oligomers or prepolymers are olefinically unsaturated and is initiated by free radicals.

20. A system according to claim 19, wherein the precursor is a vinyl chloride, vinylidene chloride, acrylonitrile, methacrylonitrile, acrylamide, methacrylamide, methylacrylate, methyl methacrylate, ethylacrylate, ethyl methacrylate, n- or tert-butylacrylate, bi- or tertbutyl methacrylate, cyclohexylacrylate, cyclohexyl methacrylate, 2-ethylhexylacrylate, 2-ethylhexyl methacrylate, benzylacrylate, benzyl methacrylate, phenyloxyethylacrylate, phenyloxy ethyl methacrylate, hydroxyethylacrylate, hydroxyethyl methacrylate, hydroxypropylacrylate, hydroxypropyl methacrylate, alkoxyethylacrylate, alkoxy methacrylate, tetrahydrofurfuryl acrylate, tetrahydrofurfuryl methacrylate, vinyl acetate, vinyl propionate, vinyl acrylate, vinyl succinate, N-vinylpyrrolidone, N-vinyl-carbazole, styrene, divinylbenzene, ethylene diacrylate, 1,6-hexanediol diacrylate, bisphenol A diacrylate, hisphenol A dimethacrylate, trimethylolpropane diacrylate, pentaerythritol triacrylate, triethylene glycol diacrylate, ethylene glycol dimethacrylate, tripropylene glycol triacrylate, pentaerythritol triacrylate, pentaerythritol tetraacrylate, ditrimethylpropane tetraacrylate, dipentaerythritol pentaacrylate or dipentaerythritol hexaacrylate.

21. A system according to claim 20, wherein curing of the precursor produces a final, cured polymer with a solubility parameter $\delta p$, which is smaller by at least 3 than the solubility parameter of the liquid crystalline mixture.

22. A system according to claim 16, wherein the amount of nitrile compounds is not more than 10%.

23. A system according to claim 16, wherein the amount of nitrile compounds is not more than 7.5%.

24. A system according to claim 16, which is essentially free of nitrile compounds.

25. A system according to claim 16, with the proviso that no pyridine- or pyrimidine-containing compounds are present.

26. A system according to claim 16, wherein the solubility parameter of the monomers, oligomers or prepolymers is 8–10.

27. A system according to claim 16, wherein the solubility parameter of the compounds of claim 1 is 8.94 to 9.64.

* * * * *